United States Patent
Markel et al.

(10) Patent No.: US 6,573,350 B1
(45) Date of Patent: Jun. 3, 2003

(54) BRANCHED SEMI-CRYSTALLINE HIGH-$C_3$ ETHYLENE-PROPYLENE COMPOSITIONS

(75) Inventors: Eric J. Markel, Kingwood, TX (US); Weiqing Weng, Houston, TX (US); Armenag H. Dekmezian, Kingwood, TX (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 0 days.

(21) Appl. No.: 09/461,797

(22) Filed: Dec. 15, 1999

Related U.S. Application Data

(60) Provisional application No. 60/113,227, filed on Dec. 21, 1998.

(51) Int. Cl.[7] .............................. C08F 4/64; C08F 10/06; C08F 10/02
(52) U.S. Cl. .................. 526/348; 526/133; 526/160
(58) Field of Search .................. 526/160, 133, 526/348

(56) References Cited

U.S. PATENT DOCUMENTS

| | | | |
|---|---|---|---|
| 4,125,699 A | | 11/1978 | Yamamoto et al. |
| 5,514,761 A | | 5/1996 | Etherton et al. |
| 5,541,236 A | | 7/1996 | DeNicola, Jr. et al. |
| 5,585,448 A | * | 12/1996 | Resconi et al. |
| 5,955,557 A | * | 9/1999 | Machida et al. ............ 526/346 |
| 6,184,327 B1 | * | 2/2001 | Weng et al. ................ 526/351 |
| 6,365,689 B1 | * | 4/2002 | Ushioda et al. |

FOREIGN PATENT DOCUMENTS

| | | |
|---|---|---|
| EP | 0 190 889 A2 | 8/1986 |
| EP | 384 431 B1 | 8/1990 |
| EP | 0 855 413 A | 7/1998 |
| WO | WO 91 17194 A | 11/1991 |
| WO | WO 94 07930 A | 4/1994 |
| WO | WO 97 00286 A | 1/1997 |
| WO | WO 97 01586 A | 1/1997 |
| WO | WO 98 33823 A | 8/1998 |
| WO | WO 99 29742 A | 6/1999 |

* cited by examiner

*Primary Examiner*—Caixia Lu
(74) *Attorney, Agent, or Firm*—Charles E. Runyan; Mandi Milbank

(57) ABSTRACT

Branched ethylene-propylene compositions which have improved melt strength and shear thinning are provided. The weight average branching index g' for the higher molecular weight region of the ethylene-propylene composition is less than 0.95. Additionally, a novel process is provided for efficiently producing a branched ethylene-propylene composition comprising:

a) contacting propylene monomers and ethylene monomers in a reactor with an inert hydrocarbon solvent or diluent and a catalyst composition comprising one or more single site catalyst compounds capable of producing an ethylene-propylene polymer at a temperature from about 50° C. to about 180° C., wherein the ratio in the reactor of the propylene and ethylene monomers to the inert hydrocarbon solvent or diluent is less than 2.0, and further, wherein the propylene and ethylene monomers and the inert hydrocarbon solvent or diluent comprise no more than 90 percent of the total contents of the reactor; and b) recovering a branched ethylene-propylene composition, wherein the weight average branching index g' for the higher molecular weight region of the ethylene-propylene composition is less than 0.95.

11 Claims, No Drawings

BRANCHED SEMI-CRYSTALLINE HIGH-C$_3$ ETHYLENE-PROPYLENE COMPOSITIONS

This application claims benefit of provisional application 60/113,227 filed Dec. 21, 1998.

FIELD OF THE INVENTION

The present invention relates to gel-free, diene-free, branched semi crystalline high-C3 ethylene-propylene polymer compositions and a method for the preparation of branched semi-crystalline high-C3 ethylene-propylene polymer compositions using single site catalyst compounds.

BACKGROUND OF THE INVENTION

The class of rubbery ethylene-propylene copolymers, conventionally referred to as EPR polymers, is well known and has gained substantial commercial acceptance. The copolymers are known to have good properties such as weatherability, ozone resistance and thermal stability and the polymers have accepted utility in automotive applications, as construction materials and as wire and cable coatings, among others. However, conventional ethylene-propylene rubbery copolymers are often difficult to process unless compounded by relatively large amounts of other materials.

A number of proposals have been made to improve the processability of the ethylene-propylene rubbery copolymer. In Yamamoto et al, U.S. Pat. No. 4,125,699, there are disclosed ethylene-propylene copolymers having a relatively high ethylene content produced in the presence of vanadium-containing polymerization catalysts. The copolymers of Yamamoto et al. are said to have improved processability because of a relatively broad molecular weight distribution. Vanadium catalysts, however, are of relatively low activity and many, if not most, of the more recent commercial ethylene-propylene rubbery copolymers are produced with a titanium-based catalyst because of the higher catalytic activity available through the use of such catalysts.

Processability has been improved in other types of polymers due to the presence of long chain branching. For example, EP 190 889 A2 discloses high energy irradiation of polypropylene to create what is believed to be polypropylene having substantial free-end long branches of propylene units. EP 384 431 discloses the use of peroxide decomposition of polypropylene in the substantial absence of oxygen to obtain a similar product.

Other examples of long chain branched polypropylene include U.S. Pat. No. 5,541,236, which introduces long chain branching by bridging two PP backbones to form H-type polymers, and U.S. Pat. No. 5,514,761, which uses dienes incorporated in the backbones to achieve a similar effect. However, it is difficult to avoid cross-linking and gel formation in such processes.

Thus, there is still a need for ethylene-propylene copolymer compositions having improved processability.

SUMMARY OF THE INVENTION

The present invention meets that need by providing gel-free, diene-free, branched ethylene-propylene (EP) polymer compositions that have improved sprayability, elasticity, and molecular weight. The weight average branching index g' for the higher molecular weight region of the ethylene-propylene polymer compositions is less than 0.95. Additionally, a novel process is provided for efficiently producing branched ethylene-propylene polymer compositions comprising:

a) contacting propylene monomers and ethylene monomers in a reactor with an inert hydrocarbon solvent or diluent and a catalyst composition comprising one or more single site catalyst compounds capable of producing an ethylene-propylene polymer at a temperature from about 50° C. to about 180° C., wherein the ratio in the reactor of the propylene and ethylene monomers to the inert hydrocarbon solvent or diluent is less than 2.0, and further, wherein the propylene and ethylene monomers and the inert hydrocarbon solvent or diluent comprise no more than 90 percent of the total contents of the reactor; and b) recovering a branched ethylene-propylene polymer composition, wherein the weight average branching index g' for the higher molecular weight region of the ethylene propylene polymer composition is less than 0.95.

DETAILED DESCRIPTION OF THE INVENTION

The present invention provides a novel method for producing gel-free, diene-free, branched EP. In addition, the branched EP product of the present invention is novel. The weight average branching index g' for the higher molecular weight region of the ethylene-propylene polymer composition is less than 0.95. In some embodiments, the weight average branching index for the higher molecular weight region of the ethylene-propylene polymer composition is less than the 0.90. In other embodiments, it is less than 0.85. These branching characteristics result in a polymer with improved rheological characteristics.

An unusual feature of the branched ethylene-propylene polymers of the present invention is the presence of a significant amount of branching in the higher molecular weight range of the polymer. This branching results in improved melt strength and shear thinning, as well as other unique physical properties. In this case, the amount of branching is determined using the weight average branching index g' of the branched ethylene-propylene polymer. The weight average branching index g' is defined as $g'=[IV]_{br}/[IV]_{lin}|_{Mw}$ wherein $[IV]_{br}$ is the intrinsic viscosity of a branched polymer sample and $[IV]_{lin}$ is the intrinsic viscosity of a linear polymer sample. It is well known in the art that as the g' value decreases, branching increases. See B. H. Zimm and W. H. Stockmayer, *J. Chem. Phys.* 17, 1301 (1949).

With regard to the molecular weight distribution of the ethylene-propylene polymer composition of the present invention, the following definitions apply:

Lower molecular weight region: That portion of the polymer product which has a molecular weight which is less than Peak MW ($M_p$).

Higher molecular weight region: That portion of the polymer product which has a molecular weight which is more than Peak MW ($M_p$).

Preferably, the ethylene-propylene polymers of the present invention have a high propylene content, wherein a majority of the monomeric content of the polymer is propylene. In other words, the propylene content of the ethylene-propylene polymers is greater than 50%. More preferably, the propylene content of the ethylene-propylene polymers is in the range of 75 to 95%. Most preferably, the propylene content of the ethylene-propylene polymers is in the range of 80 to 90%.

Other comonomers can be included in the branched ethylene-propylene of the present invention. Examples of these other comonomers include $C_4$–$C_{20}$ α-olefins, geminally disubstituted monomers, $C_5$–$C_{25}$ cyclic olefins, $C_8$–$C_{25}$ styrenic olefins, and lower carbon number ($C_3$–$C_8$) alkyl substituted analogs of the cyclic and styrenic olefins. Preferably, the other comonomers comprise from 3 to 25 mole percent of the ethylene-propylene composition. More preferably, they comprise from 5 to 20 mole percent of the ethylene-propylene composition.

In a preferred embodiment, the total comonomer content of the branched ethylene-propylene composition of the present invention is from 5 to 40 mole percent. More preferably, the total comonomer content is from 10 to 30 mole percent. Most preferably, the total comonomer content is from 15 to 25 mole percent.

Catalysts

Catalysts which are useful for producing the branched EP of the present invention include single-site catalysts which are capable of producing ethylene-propylene polymers. Single-site catalysts which are useful in the present invention include metallocene catalysts, as well as complexes such as those described in Johnson, Killian, and Brookhart, *J. Am. Chem. Soc.*, 1995, 117, 6414; Small, Brookhart and Bennett, *J. Am. Chem. Soc.*, 1998, 120, 4049–4050; Repo et al., *Journal of Organometallic Chemistry*, 1997, 549, 177–186; and Britovsek et al., *Chem. Commun.*, 1998, 849–850. Other useful single-site catalysts include bridged bis(arylamido) Group 4 compounds such as those described by D. H. McConville, et al, in *Organometallics* 1995, 14, 5478–5480. Each of these documents is incorporated by reference for the purposes of U.S. patent practice.

In some embodiments, metallocene catalysts are used to produce the branched ethylene-propylene polymers of the present invention. As used herein, "metallocene" refers generally to compounds represented by the formula $Cp_mMR_nX_q$, wherein CP is the cyclopentadienyl ring which may be substituted, or a derivative thereof that may be substituted, M is a Group-4, -5, or -6 transition metal, for example titanium, zirconium, hafnium, vanadium, niobium, tantalum, chromium, molybdenum, and tungsten. R is a hydrocarbyl group or hydrocarboxy group having from 1 to 20 carbon atoms, X is a halogen, m=1–3, n=0–3, q=0–3, and the sum of m+n+q is equal to the oxidation state of the transition metal.

Methods for making and using metallocenes are well known in the art. For example, metallocenes are detailed in U.S. Pat. Nos. 4,530,914; 4,542,199; 4,808,561; 4,871,705; 4,892,851; 4,933,403; 4,937,299; 5,017,714; 5,057,475; 5,120,867; 5,132,381; 5,155,080; 5,198,401; 5,278,119; 5,304,614; 5,324,800; 5,350,723; and 5,391,790 each fully incorporated herein by reference.

Preferred metallocenes are those that are stereorigid and comprise a Group 4, 5, or 6 transition metal, biscyclopentadienyl derivative, preferably bis-indenyl metallocene components having the following general structure:

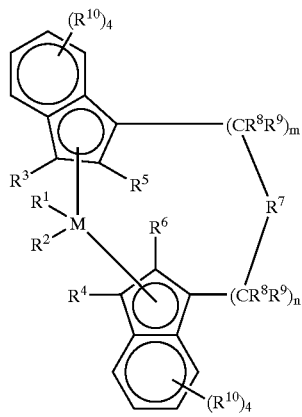

wherein $M^1$ is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine;

$R^3$ and $R^4$ are hydrogen atoms;

$R^5$ and $R^6$ are identical or different, preferably identical, are one of a hydrogen atom, halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

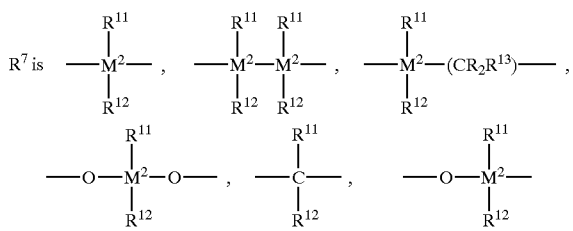

=$BR^{11}$, =$AlR^{11}$, —Ge—, —Sn—, —O—, —S—, =SO, =$SO_2$, =$NR^{11}$, =CO, $PR^{11}$, or =$P(O)R^{11}$;

wherein:

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

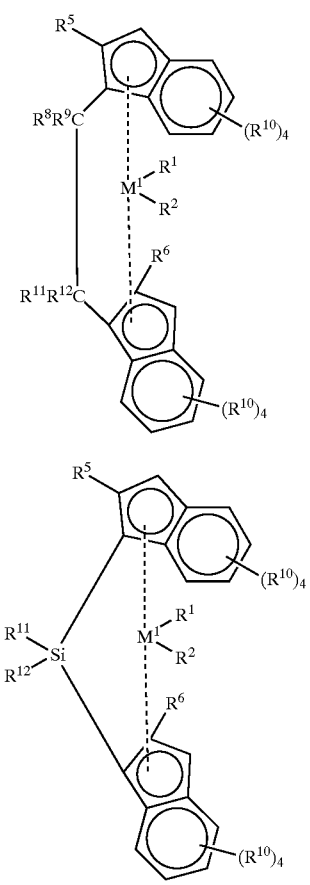

wherein:
$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Methods for preparing metallocenes of the present invention are fully described in the *Journal of Organometallic Chem.*, volume 288, (1958), pages 63–67, and in EP-A-320762, for preparation of the metallocenes described, both of which are herein fully incorporated by reference.

Illustrative but non-limiting examples of some preferred metallocenes include: Dimethylsilanylbis (2-methyl4-phenyl-1-indenyl)ZrCl$_2$, Dimethylsilanylbis(2-methyl-4,5-benzoindenyl)ZrCl$_2$; Dimethylsilanylbis(2-methyl-4,6-diisopropylindenyl)ZrCl$_2$; Dimethylsilanylbis(2-ethyl-4-phenyl-1-indenyl)ZrCl$_2$; Dimethylsilanylbis(2-ethyl-4-naphthyl-1-indenyl)ZrCl$_2$, Phenyl(Methyl)silanylbis(2-methyl-4-phenyl-1-indenyl)ZrCl$_2$, Dimethylsilanylbis(2-methyl-4-(1-naphthyl)-1-indenyl)ZrCl$_2$, Dimethylsilanylbis (2-methyl-4-(2-naphthyl)-1-indenyl)ZrCl$_2$, Dimethylsilanylbis(2-methyl-indenyl)ZrCl$_2$, Dimethylsilanylbis(2-methyl-4,5-diisopropyl-1-indenyl)ZrCl$_2$, Dimethylsilanylbis(2,4,6-trimethyl-1-indenyl)ZrCl$_2$, Phenyl(Methyl)silanylbis(2-methyl-4,6-diisopropyl-1-indenyl)ZrCl$_2$, 1,2-Ethandiylbis(2-methyl-4,6-diisopropyl-1-indenyl)ZrCl$_2$, 1,2-Butandiylbis(2-methyl-4,6-diisopropyl-1-indenyl)ZrCl$_2$, Dimethylsilanylbis(2-methyl-4-ethyl-1-indenyl)ZrCl$_2$, Dimethylsilanylbis(2-methyl-4-isopropyl-1-indenyl)ZrCl$_2$, Dimethylsilanylbis(2-methyl-4-t-butyl-1-indenyl)ZrCl$_2$, Phenyl(Methyl)silanylbis(2-methyl-4-isopropyl-1-indenyl)ZrCl$_2$, Dimethylsilanylbis(2-ethyl-4-methyl-1-indenyl)ZrCl$_2$, Dimethylsilanylbis(2,4-dimethyl-1-indenyl)ZrCl$_2$, Dimethylsilanylbis(2-methyl-4-ethyl-1-indenyl)ZrCl$_2$, Dimethylsilanylbis(2-methyl-α-acenaphth-1-indenyl)ZrCl$_2$, Phenyl(Methyl)silanylbis(2-methyl-4,5-benzo-1-indenyl)ZrCl$_2$, Phenyl(Methyl)silanylbis(2-methyl-4,5-(methylbenzo)-1-indenyl)ZrCl$_2$, Phenyl(Methyl)silanylbis(2-methyl-4,5-(tetramethylbenzo)-1-indenyl)ZrCl$_2$, Phenyl(Methyl)silanylbis(2-methyl-a-acenaphth-1-indenyl)ZrCl$_2$, 1,2-Ethandiylbis(2-methyl-4,5-benzo-1-indenyl)ZrCl$_2$, 1,2-Butandiylbis(2-methyl-4,5-benzo-1-indenyl)ZrCl$_2$, Dimethylsilanylbis(2-methyl-4,5-benzo-1-indenyl)ZrCl$_2$, 1,2-Ethandiylbis(2,4,7-trimethyl-1-indenyl)ZrCl$_2$, Dimethylsilanylbis(2-methyl-1-indenyl)ZrCl$_2$, 1,2-Ethandiylbis(2-methyl-1-indenyl)ZrCl$_2$, Phenyl(Methyl)silanylbis(2-methyl-1-indenyl)ZrCl$_2$, Diphenylsilanylbis(2-methyl-1-indenyl)ZrCl$_2$, 1,2-Butandiylbis(2-methyl-1-indenyl)ZrCl$_2$, Dimethylsilanylbis(2-ethyl-1-indenyl)ZrCl$_2$, Dimethylsilanylbis(2-methyl-5-isobutyl-1-indenyl)ZrCl$_2$, Phenyl(Methyl)silanylbis(2-methyl-5-isobutyl-1-indenyl)ZrCl$_2$, Dimethylsilanylbis(2-methyl-5-t-butyl-1-indenyl)ZrCl$_2$, Dimethylsilanylbis(2,5,6-trimethyl-1-indenyl)ZrCl$_2$, and the like.

Some preferred metallocene catalyst components are described in detail in U.S. Pat. Nos. 5,149,819, 5,243,001, 5,239,022, 5,296,434 and 5,276,208 all of which are herein fully incorporated by reference. In addition, the bis-amido and bis-arylamido transition metal catalysts of U.S. Pat. No. 5,318,935 and copending U.S. patent application Ser. No. 08/803,687, filed Feb. 24, 1997, can be useful in forming the branched ethylene-propylene polymers of the present invention.

Most preferably, the catalyst used to produce the branched ethylene-propylene of the present invention is a substituted bridged bis-indenyl zirconocene or hafnocene such as dimethylsilyl bis(2-methyl-indenyl)ZrCl$_2$, dimethylsilyl bis(2-methyl-indenyl)ZrMe$_2$, dimethylsilyl bis(2-methyl-4-phenyl-1-indenyl)ZrCl$_2$, dimethylsilyl bis(2-methyl-4-(1-naphthyl)-1-indenyl)ZrCl$_2$, or dimethylsilyl bis(indenyl) hafnium dimethyl.

The terms "cocatalyst" and "activator" are used herein interchangeably and are defined to be any compound or component which can activate a bulky ligand transition metal compound or a metallocene, as defined above. Alumoxane may be used as an activator. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

It is also within the scope of this invention to use ionizing activators, neutral or ionic, or compounds such as tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Support Materials

The metallocenes described herein may be supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 m$^2$/g, a total pore volume in the range of from about 0.1 to about 4.0 cc/g and an average particle size in the range of from about 10 to about 500 μm. More preferably, the surface area is in the range of from about 50 to about 500 m$^2$/g, the pore volume is in the range of from about 0.5 to about 3.5 cc/g and the average particle size is in the range of from about 20 to about 200 μm. Most preferably the surface area is in the range of from about 100 to about 400 m$^2$/g, the pore volume is in the range of from about 0.8 to about 3.0 cc/g and the average particle size is in the range of from about 30 to about 100 μm. The average pore size of typical porous support materials is $\leq 10$ Å. Preferably, a support material is used that has an average pore diameter of $\leq 50$ Å, and most preferably it is in the range of from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.) Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be pre-activated separately and then combined with the support material either separately or together. If the metallocenes are separately supported, then preferably, they are dried then combined as a powder before use in polymerization.

Regardless of whether the metallocene and activator are separately precontacted or whether the metallocene and activator are combined at once, the total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, *Experimental Methods in Catalyst Research*, Academic Press, 1968, pages 67–96.

Methods of supporting ionic catalysts comprising metallocene cations and noncoordinating anions are described in WO 91/09882, WO 94/03506, WO 96/04319 and U.S. Pat. No. 5,643,847 (incorporated herein by reference.) The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. For details regarding prepolymerization, see U.S. Pat. Nos. 4,923,833 and 4,921,825, EP 0 279 863 and EP 0 354 893 each of which is fully incorporated herein by reference.

Polymerization Processes

Branched ethylene-propylene polymers of the present invention may be produced using the catalyst described above in any process including gas, slurry, suspension, or solution phase processes. Additionally, combinations of the above reactor types in multiple, series reactors, or multiple reaction conditions, or multiple catalyst configurations are explicitly intended.

In the preferred embodiment, this invention is directed toward the polymerization of ethylene and propylene in a slurry or solution phase polymerization process, particularly a solution polymerization process.

Typically in a gas phase polymerization process a continuous cycle is employed wherein one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of from about 1 to about 500 atmospheres or even greater and temperatures in the range of from –60° C. to about 280° C. In a slurry polymerization, a suspension of solid, particulate polymer is formed in a liquid or supercritical polymerization medium to which ethylene, propylene and comonomers and often hydrogen along with catalyst are added. The medium employed should be liquid under the conditions of polymerization and relatively inert. The liquid employed in the polymerization medium can be an inert hydrocarbon solvent or diluent. For example, an alkane or a cycloalkane such as hexane or isobutane can be used. In a preferred embodiment, hexane or propylene monomer serves as the polymerization diluent.

Preferably, the ethylene monomers, the propylene monomers and the inert hydrocarbon solvent or diluent comprise no more than 90 percent of the total contents of the reactor. More preferably, they comprise no more than 80 percent of the total contents of the reactor. Most preferably, the ethylene monomers, the propylene monomers and the inert hydrocarbon solvent or diluent comprise no more than 70 percent of the total contents of the reactor. In a preferred embodiment, the ethylene monomers, the propylene monomers and the inert hydrocarbon solvent or diluent comprise at least 50 percent of the total contents of the reactor.

Also, the ratio in the reactor of the ethylene and propylene monomers to the inert hydrocarbon solvent or diluent in the reactor feed is preferably less than 2.0. More preferably, the ratio is less than 1.0. Still more preferably, it is less than 0.8. Most preferably, the ratio in the reactor of the ethylene and propylene monomers to the inert hydrocarbon solvent or diluent in the reactor feed is less than 0.5.

Preferably, the polymerization is carried out using a pressure of from about 200 kPa to about 7,000 kPa at a temperature in the range of from about 50° C. to about 180° C.

More preferably, the polymerization is carried out at a temperature in the range of from about 50° C. to about 130° C. Most preferably, the polymerization is carried out at a temperature in the range of from 60° C. to 110° C.

The polymerization may be conducted in batch, semi-batch or continuous mode and the entire polymerization may take place in one reactor or the polymerization may be carried out in a series of reactors. Preferably, the polymerization is carried out in continuous mode.

The reaction time for the polymerization of the present invention will depend upon the catalyst system and reaction conditions.

The above-described temperatures, reaction times and other conditions are considered suitable ethylene-propylene polymerization conditions for the purposes of this invention.

Hydrogen may be added to the polymerization system as a molecular weight regulator in the first and/or subsequent reactors depending upon the particular properties of the product desired and the specific metallocenes used. When metallocenes having different hydrogen responses are used, the addition of hydrogen will affect the molecular weight distribution of the polymer product accordingly. Hydrogen may also affect the distribution of branching.

For preparation of the branched ethylene-propylene polymer, preactivation of the metallocene may be advantageous. For example, it is widely known in the art that preactivation of the metallocene with alumoxane before addition to a continuous solution-phase reactor yields higher activities than continuous addition of metallocene and activator in two separate streams. Furthermore, it may be advantageous to control precontacting time to maximize catalyst effectiveness, e.g., avoiding excessive aging of the activated catalyst composition.

Industrial Utility

The branched ethylene-propylene polymers of the present invention exhibit improved melt properties, such as shear thinning, elasticity, melt strength and low viscosity. The branched ethylene-propylene polymers of the present invention are useful in a variety of applications, including hot melt adhesives, elastic compositions, modifiers and molded products.

In order that the invention may be more readily understood, reference is made to the following examples, which are intended to illustrate the invention but not to limit the scope thereof.

EXAMPLES

General

Liquids were measured into the reactor feed tanks using calibrated sight glasses. High purity (>99.5%) hexane was purified by passing first through basic alumina activated at high temperature in nitrogen, followed by molecular sieve activated at high temperature in nitrogen. Polymerization grade ethylene was supplied directly in a nitrogen-jacketed line and used without further purification, and propylene was purified by passing it through activated basic alumina and molecular sieves. Dimethylanilinium tetrakis (perfluoroaryl)borate [DMAH]$^-$ [$(C_6F_5)_4B$] was obtained from Boulder Scientific Co., Mead, Colo.

Propylene was measured into the reactor through a calibrated container. To ensure the reaction medium was well mixed, a flat-paddle stirrer rotating at 750 rpm was used. Polymerization was performed in 0.5 liter (continuous) Zipperclave reactor equipped with a water jacket for temperature control. The reactors were first cleaned by heating to 120° C. in toluene to dissolve any polymer residues, then cooled and drained. Next, the reactor was heated using jacket water at 110° C. and the reactor was purged with flowing nitrogen for a period of >30 minutes.

Catalysts

All catalyst preparations were performed in an inert atmosphere with <1.5 ppm $H_2O$ content. The metallocenes used in the syntheses were obtained from internal sources. The catalysts, Dimethylsilyl bis(2-methyl-indenyl)ZrMe$_2$ ("Catalyst A") and Dimethylsilyl bis(indenyl)hafnium dimethyl ("Catalyst B") were preactivated with [DMAH]$^-$ [$(C_6F_5)_4B$]. Catalysts for the continuous reactions were metered continuously into the reactor from a stainless steel supply bomb (pressurized at 100 psig) using an HPLC pump.

Continuous Polymerization

A fully instrumented 0.5 liter Zipperclave reactor was used for continuous reaction experiments. DMAH-activated catalysts were used in these reactions. Each run utilized 30 mg of Catalyst A or Catalyst B (1:1.3 molar DMAH) in 100 ml toluene, preactivated 15 minutes before loading into the feed bomb for injection/metering by the HPLC pump. Hexane, propylene and ethylene feeds were premixed in an 18 liter feed tank. Ethylene concentrations were controlled by controlled addition of an ethylene partial pressure above that of the propylene/hexane mix. After ethylene addition, the feed tank was closed, then pressurized with nitrogen to 200 psig. A positive displacement pump was used to meter the feed into the reactor and to raise the pressure sufficiently to prevent bubbling of the reaction medium at reaction temperatures. In this way, liquid-full reaction was accomplished. Reactor pressure was controlled using a downstream backpressure regulator. At the highest pump setting, a residence time of approx. 2 minutes was obtained using the 0.5 liter reactor body.

GPC/DRI and GPC/Vis Analysis

The molecular weight and MWD of the polymers were measured by a Waters 150-C ALC/GPC. Branching levels were measured by GPC/Vis and are reported as g' at each molecular weight in the GPC trace. Relating the measured g' to branched structure requires the application of Zimm-Stockmayer theory, which assumes a random distribution of branch sizes for each population of branched structures (singly, doubly, triply branched, etc.) at each molecular weight. See B. H. Zimm and W. H. Stockmayer, J. Chem. Phys. 17, 1301 (1949).

Examples 1–24

Experiments were run using continuous polymerization conditions. The data from these runs is presented in Table 1.

TABLE 1

Continuous Reactor Used to Synthesize Branched High-C$_3$ EP Compositions

| Example | Cat. | Pump Rate (rel.) | Temp (C.) | Ethylene Partial Pressure (psi) | Feed C$_3$ Flow (g/min) | Yield g/min | Mn* | Mw* | Mz* | Mw/Mn | Mole % Ethylene** | g'(ave)*** |
|---|---|---|---|---|---|---|---|---|---|---|---|---|
| 1 | A | 50 | 90 | 35 | 19.27 | 12.9 | 4000 | 10700 | 21100 | 2.67 | 14.38 | .660 |
| 2 | A | 25 | 90 | 35 | 19.27 | 13.65 | 4430 | 12400 | 23500 | 2.79 | 15.16 | .665 |
| 3 | A | 25 | 70 | 35 | 19.27 | 10.91 | 7420 | 17100 | 28500 | 2.30 | 16.46 | .637 |
| 4 | A | 25 | 70 | 35 | 19.27 | 8.88 | 13600 | 28800 | 44900 | 2.11 | 15.44 | .631 |
| 5 | B | 50 | 90 | 35 | 19.27 | 20.7 | 14300 | 36100 | 59800 | 2.52 | 14.8 | .637 |
| 6 | B | 25 | 90 | 35 | 19.27 | 10.33 | 22900 | 46900 | 74500 | 2.04 | 15.6 | .6944 |
| 7 | B | 50 | 70 | 35 | 19.27 | 18.85 | 34300 | 69400 | 113400 | 2.02 | 15.2 | .714 |
| 8 | B | 25 | 70 | 35 | 19.27 | 12.28 | 41300 | 81700 | 136100 | 1.97 | 14.0 | .797 |
| 9 | B | 50 | 90 | 18 | 19.27 | 11.39 | 16900 | 36000 | 58000 | 2.13 | 11.2 | .692 |
| 10 | B | 25 | 90 | 18 | 19.27 | 8.88 | 25100 | 48500 | 74700 | 1.93 | 11.9 | .712 |
| 11 | B | 50 | 70 | 18 | 19.27 | 11.3 | 38900 | 75900 | 121600 | 1.95 | 8.8 | .798 |
| 12 | B | 25 | 70 | 18 | 19.27 | 8.99 | 48100 | 91000 | 145400 | 1.89 | 9.7 | .830 |
| 13 | B | 50 | 90 | 13.5 | 19.27 | 10.18 | 12800 | 32100 | 57600 | 2.508 | 7.8 | |
| 14 | B | 25 | 90 | 13.5 | 19.27 | 9.57 | 16300 | 37500 | 65000 | 2.301 | 7.7 | |
| 15 | B | 50 | 70 | 13.5 | 19.27 | 10.19 | 29800 | 63800 | 106000 | 2.141 | 8.5 | |
| 16 | B | 50 | 70 | 13.5 | 19.27 | 9.8 | 46300 | 93000 | 158200 | 2.009 | 6.4 | |
| 17 | B | 25 | 70 | 13.5 | 19.27 | 9.38 | 49700 | 97600 | 157300 | 1.964 | 6.2 | |
| 18 | B | 25 | 60 | 13.5 | 19.27 | 8.85 | 73800 | 148100 | 244600 | 2.007 | 7.1 | |
| 19 | A | 50 | 90 | 13.5 | 19.27 | 9.0 | 5020 | 10300 | 18700 | 2.052 | 8.0 | |
| 20 | A | 25 | 90 | 13.5 | 19.27 | 7.73 | 5300 | 10600 | 17800 | 2.000 | 8.2 | |
| 21 | A | 50 | 70 | 13.5 | 19.27 | 10.23 | 9420 | 19500 | 32100 | 2.070 | 7.9 | |
| 22 | A | 25 | 70 | 13.5 | 19.27 | 10.02 | 12800 | 25800 | 41100 | 2.016 | 7.0 | |

TABLE 1-continued

Continuous Reactor Used to Synthesize Branched High-C₃ EP Compositions

| Example | Cat. | Pump Rate (rel.) | Temp (C.) | Ethylene Partial Pressure (psi) | Feed C₃ Flow (g/min) | Yield g/min | Mn* | Mw* | Mz* | Mw/Mn | Mole % Ethylene** | g'(ave)*** |
|---|---|---|---|---|---|---|---|---|---|---|---|---|
| 23 | A | 50 | 55 | 13.5 | 19.27 | 10.16 | 23100 | 44300 | 68800 | 1.918 | 9.0 | |
| 24 | A | 25 | 55 | 13.5 | 19.27 | 9.78 | 18000 | 41400 | 67900 | 2.300 | 4.8 | |

*data from GPC/Vis
**as measured using FTIR
***weight average of molecular weights > Mp While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A branched, semi-crystalline ethylene-propylene polymer composition produced by the process of:
   a) contacting propylene monomers and ethylene monomers in a single reactor with an inert hydrocarbon solvent or diluent and a catalyst composition comprising one single site catalyst compound in rac form capable of producing an ethylene-propylene polymer at a temperature from about 50° C. to about 180° C., wherein the ratio in the reactor of said propylene and ethylene monomers to said inert hydrocarbon solvent or diluent is less than 2.0, and further, wherein said propylene and ethylene monomers and said inert hydrocarbon solvent or diluent comprise at least 50 percent of the total contents of said reactor; and
   b) recovering a branched, semi-crystalline ethylene-propylene polymer composition, wherein the weight average branching index g' for the higher molecular weight region of said ethylene propylene composition is less than 0.95.

2. A branched ethylene-propylene polymer composition produced by the process of:
   a) contacting propylene monomers and ethylene monomers in a single reactor with an inert hydrocarbon solvent or diluent and a catalyst composition comprising one single site catalyst compound capable of producing an ethylene-propylene polymer at a temperature from about 50° C. to about 180° C., wherein the catalyst compound is in a rac form, wherein the ratio in the reactor of said propylene and ethylene monomers to said inert hydrocarbon solvent or diluent is less than 2.0, and further, wherein said propylene and ethylene monomers and said inert hydrocarbon solvent or diluent comprise at least 50 percent of the total contents of said reactor; and
   b) recovering a branched ethylene-propylene composition, wherein the weight average branching index g' for the higher molecular weight region of said ethylene propylene composition is less than 0.95.

3. The composition of claim 1 or claim 2, wherein said propylene and ethylene monomers in step a) are contacted at a temperature from 60° C. to 110° C.

4. The composition of claim 1 or claim 2, wherein said one single site catalyst compound is selected from the group consisting of substituted bridged bis-indenyl zirconocenes and hafnocenes.

5. The composition of claim 1 or claim 2, wherein the ratio in the reactor of said propylene and ethylene monomers to said inert hydrocarbon solvent or diluent is less than 1.0.

6. The composition of claim 5 wherein a majority propylene polymer composition comprises propylene, ethylene comonomer and, optionally, other comonomers, wherein the total comonomer content of the majority propylene composition is from 5 to 40 mole percent.

7. The composition of claim 6 wherein the weight average branching index g' for the higher molecular weight region of said ethylene-propylene polymer composition is less than 0.90.

8. The composition of claim 6 wherein the weight average branching index g' for the higher molecular weight region of said ethylene-propylene polymer composition is less than 0.85.

9. The composition of claim 6 wherein said one or more other comonomers are selected from the group consisting of C₄–C₂₀ α-olefins, geminally disubstituted monomers, C₅–C₂₅ cyclic olefins, C₈–C₂₅ styrenic olefins, and C₃–C₈ alkyl substituted analogs of the cyclic and styrenic olefins.

10. The composition of claim 9 wherein said one or more other comonomers comprise from 3 to 25 mole percent of said ethylene-propylene polymer composition.

11. The composition of claim 9 wherein said one or more other comonomers comprise from 5 to 20 mole percent of said ethylene-propylene polymer composition.

* * * * *